Figure 1:
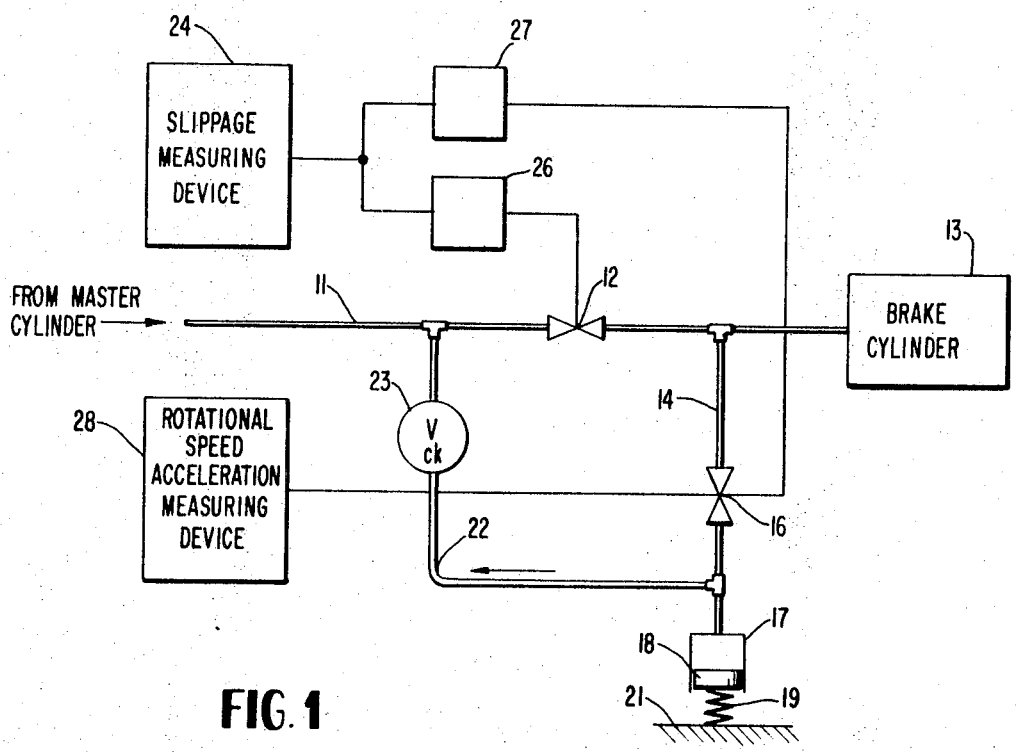

United States Patent

[11] 3,582,152

[72] Inventors Manfred H. Burckhardt
Wailblingen;
Hans-Jorg Florus, Goppingen, both of, Germany
[21] Appl. No. 819,044
[22] Filed Apr. 24, 1969
[45] Patented June 1, 1971
[73] Assignee Daimler-Benz Aktiengesellschaft
Stuttgart-Unterturkheim, Germany
[32] Priority Apr. 24, 1968
[33] Germany
[31] P 17 55 302.5

[54] INSTALLATION FOR CONTROLLING TWO VALVES FOR THE PREVENTION OF THE BLOCKING OF BRAKES
11 Claims, 2 Drawing Figs.

[52] U.S. Cl. .................................................. 303/21, EB
188/181A, 303/68
[51] Int. Cl. ...................................................... B60t 8/08

[50] Field of Search ............................................ 188/181;
303/6, 21, 24, 61—63, 68—69

[56] References Cited
UNITED STATES PATENTS
| | | | |
|---|---|---|---|
| 3,066,988 | 12/1962 | McRae ........................ | 303/21UX |
| 3,401,987 | 9/1968 | Horvata ....................... | 303/21 |
| 3,425,751 | 2/1969 | Wehde et al. ................ | 303/21 |
| 3,441,320 | 4/1969 | Flory ........................... | 303/21 |
| 3,467,444 | 9/1969 | Leiber ......................... | 303/21 |

*Primary Examiner*—Milton Buchler
*Assistant Examiner*—John J. McLaughlin
*Attorney*—Craig, Antonelli, Stewart and Hill

ABSTRACT: An installation for preventing the blocking of brakes, in which a first valve is connected in the brake pressure medium line leading to the brake cylinder and a second valve is connected with this line between the first valve and the brake cylinder while the valves are so controlled that the first normally open valve is closed upon the occurrence of a lower slippage while the second valve, which is normally closed, is opened upon the occurrence of a higher slippage.

INVENTORS
MANFRED H. BURCKHARDT
HANS-JÖRG FLORUS

BY

Craig, Antonelli, Stewart & Hill   ATTORNEYS

INSTALLATION FOR CONTROLLING TWO VALVES FOR THE PREVENTION OF THE BLOCKING OF BRAKES

The present invention relates to an installation for the control of two valves of which the first valve is connected in a brake pressure medium line which leads from a master brake cylinder to the brake cylinder of a wheel of a motor vehicle, and of which the second valve is connected to the brake pressure medium line between the first valve and the brake cylinder and leads to a brake medium reservoir or receiving tank, and which also includes a slippage-measuring device controlling the valves.

As is known, the normally open, first valve is closed and the normally closed, second valve is opened when the slippage-measuring device for the respective wheel has determined a predetermined slip. By this actuation of the valve, one achieves, on the one hand, that the brake pressure medium line is closed and, on the other, that the pressure prevailing between the first valve and the brake cylinder of the wheel can decrease. During this pressure decrease, brake medium fluid flows from this part of the brake pressure medium line into a brake medium-receiving tank. At least temporarily brake medium fluid is therefore removed, which becomes even more grave as, for the most part, several control cycles or control plays are necessary in order to prevent the blocking. Since the supply in brake fluid is limited, there exists the danger that suddenly no brake fluid is available for further control plays or cycles.

It is an object of the present invention to produce an installation by means of which the two valves are so controlled that the brake fluid consumption remains a minumum.

According to the present invention, the underlying problems are solved in that the first valve constructed as operating or normally open valve is connected with a first slippage-measuring device of any conventional construction responding to a loser slippage and the second valve constructed as normally closed valve is connected with a second slippage-measuring device responding to a larger slippage.

It is advantageous if the second valve is connected with a rotary-acceleration measuring device which has a threshold value. The brake fluid consumption can thereby by decreased once more because it leads considerably more rapidly to a result to measure the rotary acceleration than is the case with the slippages. In this case, the second valve is opened with a larger slippage value and upon reaching the acceleration threshold is closed.

It is particularly favorable if the lower slippage amounts to about 5 percent and the larger slippage to about 15 percent while the rotary acceleration threshold is about 30 Radians-sec.$^{12}$. These values have given excellent results in practice.

It is furthermore very appropriate if the slippage-measuring device for each wheel includes a voltage generator, if the voltage generators are connected in a conventional manner with a maximum voltage line if for each wheel, a first amplifier is provided responding to the lower slippage and a second amplifier responding to the higher slippage, if the first amplifier is connected with the first valve and the second amplifier with the second valve, and if the generator of the wheel associated with the two amplifiers is connected with a second input of each of the two amplifiers.

The first amplifier is then responsible for the control of a magnetic valve during lower slippage and the second amplifier for the response of the second magnet during higher slippage, a circuit which is realizable in a very simple manner.

It is particularly appropriate if the rotary acceleration measuring device is constituted by a condenser of appropriate value and by an operational amplifier of conventional construction connected in series with the condenser. Also, such a circuit distinguishes itself by simplicity, low cost and general usability of customary commercially available structural elements.

Accordingly, it is an object of the present invention to provide an installation for the control of two valves for preventing blocking of brakes which avoids by simple means the aforementioned shortcomings and drawbacks encountered in the prior art.

Another object of the present invention resides in an installation for the control of two valves for the prevention of brake blocking in motor vehicles which is characterized by simplicity in construction use of commercially available components, low cost in manufacture and reliability in operation.

A further object of the present invention resides in a control installation of the type described above which assures a minimum of brake fluid consumption.

Still another object of the present invention resides in a control installation for preventing blocking of brakes which enhances significantly the availability of a sufficient supply of brake fluid at all times.

Figure 2:
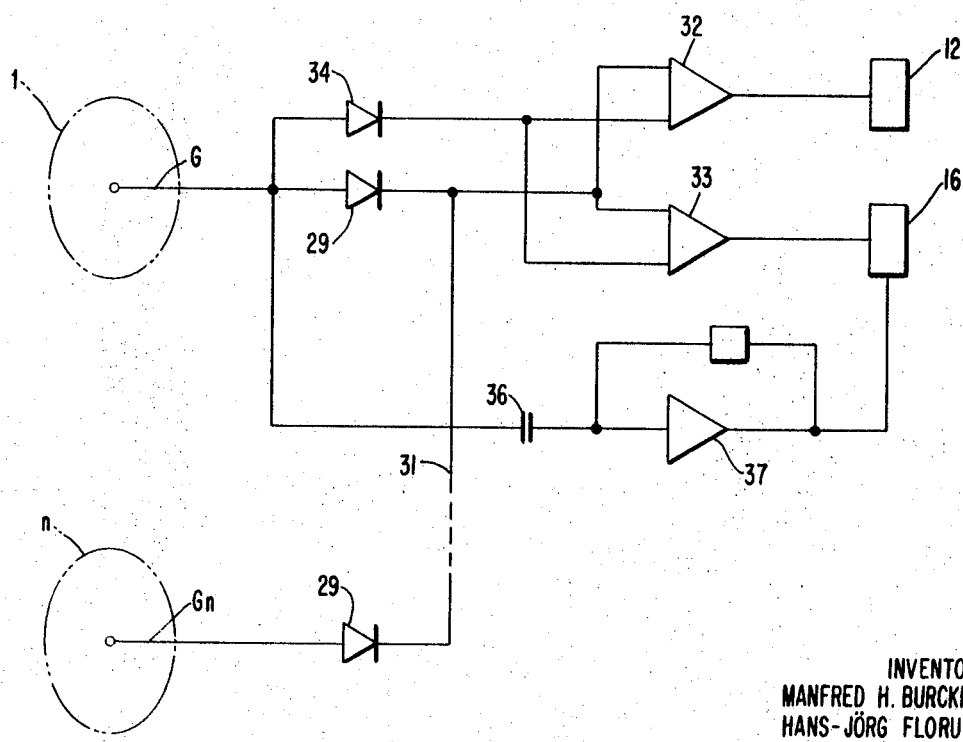

These and further objects, features and advantages of the present invention will become more obvious from the following description when taken in connection with the accompanying drawing which shows, for purposes of illustration only, two embodiments in accordance with the present invention, and wherein:

FIG. 1 is a combined schematic hydraulic and electric diagram for a control installation in accordance with the present invention; and FIG. 2 is a schematic diagram of an installation in accordance with the present invention showing the slippage-measuring device and the rotational speed acceleration measuring device for the control of the magnetic valves.

Referring now to the drawing wherein like reference numerals are used in the two views to designate like parts, and more particularly to the circuit diagram of FIG. 1, a brake pressure medium line 11 is connected with a conventional master brake cylinder (not shown) and leads by way of a first valve 12 to a brake cylinder 13 of a motor vehicle (not shown). A discharge line 14 branches off between the first valve 12 and the brake cylinder 13 in which is connected a second valve 16. The discharge line 14 leads to a brake medium-receiving tank which is illustrated in FIG. 1 by a cylinder 17, a piston 18, and a spring 19 that is disposed between the piston 18 and a fixed point 21. A return line 22 branches off from line 14 at the indicated place and includes a conventional check valve 23.

A slippage-measuring device 24 of any conventional construction, not forming part of the present invention, controls two control devices 26 and 27, again of any known conventional construction, of which the control device 26 responds to a slippage of 5 percent and the control device 27 to a slippage of 15 percent. Since such control devices 26 and 27 as well as the slippage-measuring device are of known conventional construction and form no part of the present invention, a detailed description thereof is dispensed with herein.

In the illustrated embodiment, the control devices 26 and 27 control the valves 12 and 16, respectively. The valve 16 can additionally be controlled by a rotary-acceleration measuring device 28, again of any conventional construction, not forming part of the present invention, which responds to a rotary-acceleration of 30 Radians-sec.$^{12}$. As a result thereof, the pressure in the brake cylinder 13 builds up for 5 percent slippage by way of the valve 12. If a higher slip is reached, then the pressure remains constant. If the slippage increases above 15 percent, then the brake medium is relieved by way of valve 16, and more particularly, for such length of time until the slippage, as determined by the measuring device 24 and control device 26, again has fallen below 15 percent. If a rotary-acceleration measuring device 28 is connected in the circuit as shown, then the arrangement according to FIG. 1 operates as follows:

| Slippage | First valve 12 | Second valve 16 |
|---|---|---|
| $s<5\%$ | Open | Closed. |
| $5\%<s<15\%$ | Closed | Do. |
| $s>15\%$ | do | Open. |
| $dw/dt \geq 30$ sec.$^{-1}$ | do | Closed. |

Consequently, the advantage is obtained thereby that in addition to a very rapid reaction, only one valve has to be actuated at any one time which facilitates the control of the necessary short periods of time.

Brake fluid is economized by reason of the fact that the second valve 16 is only opened when the slippage exceeds 15 percent.

If, however, the second valve is once opened, then the brake fluid which is under a pressure of more than 100 atmospheres, flows back into the cylinder 17, moves the piston 18 downwardly and compresses the spring 19. If, however, no brake pressure is present any more, i.e., during normal drive, then the spring 19 forces the brake fluid back into the brake fluid line 11 by way of the line 22 and the check valve 23 so that it is again available for further use.

The indicated slippage and accelerating values enable approximately 15—20 control cycles or control plays when one is to decelerate from a velocity of 180 km. per hour with 5 m./sec$^2$.

The circuit according to FIG. 2 operates as follows:

A generator G is coordinated to each wheel so that the wheel 1 includes the generator G 1 and the wheel $n$ the generator G$n$. All generators $n$ are connected by way of diodes 29 to a maximum voltage line 31. This maximum line 31 therefore has by reason of the diodes 29 that voltage which is produced by the generator of the wheel rotating the fastest. Two amplifiers 32 and 33 of conventional construction are also coordinated to each wheel. The amplifiers 32 and 33 are fed from the maximum voltage line in one input thereof whereas the other input thereof is directly connected by way of a diode 34 to the generator G1. The amplifier 32 responds to a slippage of about 5 percent whereas the amplifier 33 responds to a slippage of 15 percent. The amplifiers 32 and 33 therefore do not determine anything but the difference between the highest voltage prevailing in the maximum voltage line 31 which is produced corresponding to the predetermined slippage, and the voltage actually produced by the associated generator. The amplifier 32 controls the magnetic valve 12, and the amplifier 33, the magnetic valve 16.

The magnetic valve 16 is further controlled by the generator G 1 by way of a condenser 36 and a conventional operational amplifier 37 which determine the rotary acceleration of the first wheel and respond with a rotary acceleration of 30 Radians sec.$^{12}$.

While we have shown and described only two embodiments in accordance with the present invention, it is understood that the same is not limited thereto but is susceptible of numerous changes and modifications as known to a person skilled in the art and we therefore do not which to be limited to the details shown and described herein but intend to cover all such changes and modifications as are known to those skilled in the art.

We claim:

1. An installation for the control of valves of which the first valve is connnected in a brake pressure medium line that leads from a master brake cylinder to the brake cylinder of a wheel of a motor vehicle, and of which the second valve is connected to the brake pressure medium line between the first valve and the corresponding brake cylinder and leads to a brake medium tank, and which further includes slippage-measuring means for controlling the two valves, characterized by a first slippage-measuring means responding to a lower slippage which is operatively connected with the first valve and second slippage-measuring means responding to a higher slippage and operatively connected with the second valve.

2. An installation according to claim 1, characterized in that said first valve is a normally open valve and the second valve is a normally closed valve.

3. An installation according to claim 2, characterized by rotary-acceleration measuring means operatively connected with said second valve.

4. An installation according to claim 3, characterized in that said acceleration-measuring means has a threshold value.

5. An installation according to claim 4, characterized in that the lower slippage is about 5 percent the higher slippage about 15 percent and the acceleration threshold value about 30 Radians-sec.$^{12}$.

6. An installation according to claim 5, characterized in that the slippage-measuring means for each wheel includes a voltage generator, the voltage generators of all wheels being connected by way of rectifier means with a maximum voltage line, and two amplifier means for each wheel, the first amplifier means responding to the lower slippage and the second amplifier means to the higher slippage, the first amplifier means being operatively connected with the first valve, and the second amplifier means with the the second valve, and in that the generator of the wheel associated with the two amplifier means is operatively connected with a second input of each of the two amplifier means.

7. An installation according to claim 6, wherein the rotary-acceleration measuring means includes a condenser and a series-connected operational amplifier means.

8. An installation according to claim 1, characterized in that the slippage-measuring means for each wheel includes a voltage generator, the voltage generators of all wheels being connected by way of rectifier means with a maximum voltage line, and two amplifier means for each wheel, the first amplifier means responding to the lower slippage and the second amplifier means to the higher slippage, the first amplifier means being operatively connected with the first valve, and the second amplifier means with the second valve, and in the generator of the wheel associated with the two amplifier means is operatively connected with a second input of each of the two amplifier means.

9. An installation according to claim 8, characterized by rotary-acceleration measuring means operatively connected with said second valve.

10. An installation according to claim 9, wherein the rotary-acceleration measuring means includes a condenser and a series-connected operational amplifier means.

11. An installation according to claim 9, characterized in that said acceleration-measuring means has a threshold value.